(12) United States Patent
Shen et al.

(10) Patent No.: US 9,749,154 B2
(45) Date of Patent: Aug. 29, 2017

(54) METHOD OF CHANNEL ESTIMATION BY PHASE ROTATION IN AN ORTHOGONAL FREQUENCY DIVISION MULTIPLEXING (OFDM) SYSTEM

(71) Applicant: Spreadtrum Communications (Shanghai) Co., Ltd., Shangahi (CN)

(72) Inventors: Xuqiang Shen, Shanghai (CN); Qiang Cao, Shanghai (CN); Xiaojian Dong, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/782,967

(22) PCT Filed: Jun. 20, 2013

(86) PCT No.: PCT/CN2013/077556
§ 371 (c)(1),
(2) Date: Oct. 7, 2015

(87) PCT Pub. No.: WO2014/166164
PCT Pub. Date: Oct. 16, 2014

(65) Prior Publication Data
US 2016/0043882 A1 Feb. 11, 2016

(30) Foreign Application Priority Data
Apr. 9, 2013 (CN) .......................... 2013 1 0121784

(51) Int. Cl.
*H04L 25/02* (2006.01)
*H04L 27/26* (2006.01)
*H04L 5/00* (2006.01)

(52) U.S. Cl.
CPC ........ *H04L 25/0204* (2013.01); *H04L 5/0007* (2013.01); *H04L 25/022* (2013.01);
(Continued)

(58) Field of Classification Search
CPC ............. H04L 27/2675; H04L 27/2657; H04L 27/2659; H04L 27/266; H04L 27/2665;
(Continued)

(56) References Cited

U.S. PATENT DOCUMENTS

| 2006/0193392 A1* | 8/2006 | Kim ..................... H04L 27/2659 375/260 |
| 2010/0034186 A1* | 2/2010 | Zhou ................... H04L 27/2621 370/344 |

(Continued)

FOREIGN PATENT DOCUMENTS

| CN | 11166040 | 4/2008 |
| CN | 102035764 | 4/2011 |
| WO | 2011/106626 | 9/2011 |

OTHER PUBLICATIONS

PCT International Search Report dated Dec. 18, 2013, PCT Patent Application PCT/CN2013/077556.
(Continued)

*Primary Examiner* — Michelle M Koeth
(74) *Attorney, Agent, or Firm* — Vierra Magen Marcus LLP (57) ABSTRACT

The method includes receiving communication signals in a time domain and to aa frequency domain, providing resource blocks in the frequency domain including a first and second resource block, selecting first pilot signals from first resource block and second pilot signals from second resource block, calculating a first average value based on the first pilot signals, calculating a second average value, determining a phase difference between the first and second pilot (Continued)

signals using the first and second average values, adjusting a first phase of first resource block using the phase difference, providing a first waveform using the first resource block with adjusted the first phase and the second resource block, applying a smoothing filter against the first waveform to generate a second waveform, generating a third waveform using at least the first and third set of phase and amplitude differences, and converting third waveform from frequency domain to time domain.

18 Claims, 9 Drawing Sheets

(52) U.S. Cl.
CPC ...... *H04L 25/0224* (2013.01); *H04L 25/0226* (2013.01); *H04L 25/0232* (2013.01); *H04L 27/2657* (2013.01); *H04L 27/2662* (2013.01); *H04L 27/2672* (2013.01); *H04L 27/2675* (2013.01); *H04L 5/0041* (2013.01); *H04L 27/2695* (2013.01)

(58) Field of Classification Search
CPC .............. H04L 27/2671; H04L 27/2672; H04L 27/2695; H04L 25/0212; H04L 25/0202; H04L 25/0224; H04L 27/2662; H04L 25/0204; H04L 25/022; H04L 25/0226; H04L 25/0232; H04L 5/0041; H04L 5/0007; H04W 56/001; H04W 64/006
See application file for complete search history.

(56) References Cited

U.S. PATENT DOCUMENTS

| | | | | |
|---|---|---|---|---|
| 2011/0122760 | A1* | 5/2011 | Kwon | H04J 11/0043 370/210 |
| 2011/0158343 | A1* | 6/2011 | Park | H04L 25/0212 375/285 |
| 2012/0069889 | A1* | 3/2012 | Molnar | H04J 11/0023 375/227 |
| 2014/0036860 | A1* | 2/2014 | Ma | H04L 27/2657 370/330 |

OTHER PUBLICATIONS

PCT Written Opinion of the International Searching Authority dated Dec. 18, 2013, PCT Patent Application PCT/CN2013/077556.
English Abstract of Chinese Patent Application No. CN102035764.
English Abstract of Chinese Patent Application No. CN11166040.

\* cited by examiner

METHOD OF CHANNEL ESTIMATION BY PHASE ROTATION IN AN ORTHOGONAL FREQUENCY DIVISION MULTIPLEXING (OFDM) SYSTEM

CROSS-REFERENCE TO RELATED APPLICATIONS

This application is related to application Ser. No. 14/233,165, entitled ORTHOGONAL FREQUENCY DIVISION MULTIPLEXING (OFDM) CHANNEL ESTIMATION TO IMPROVE THE SMOOTHING PROCESS, filed concurrently herewith and, application Ser. No. 14/131,926, entitled CHANNEL ESTIMATION METHOD FOR OVERCOMING CHANNEL DISCONTINUITY IN SUB-BANDS OF AN ORTHOGONAL FREQUENCY DIVISION MULTIPLEXING (OFDM) SYSTEM, filed concurrently herewith, which are incorporated by reference in their entirety for any and all purposed.

BACKGROUND

In general communication systems, signal transmission in wireless channel presents channel characteristics such as multipath information, doppler frequency shift, and phase rotation of received data. Therefore, when a receiver receives a signal, it estimates and uses current channel information to equalize the received data and restore the sent data.

Figure 1:
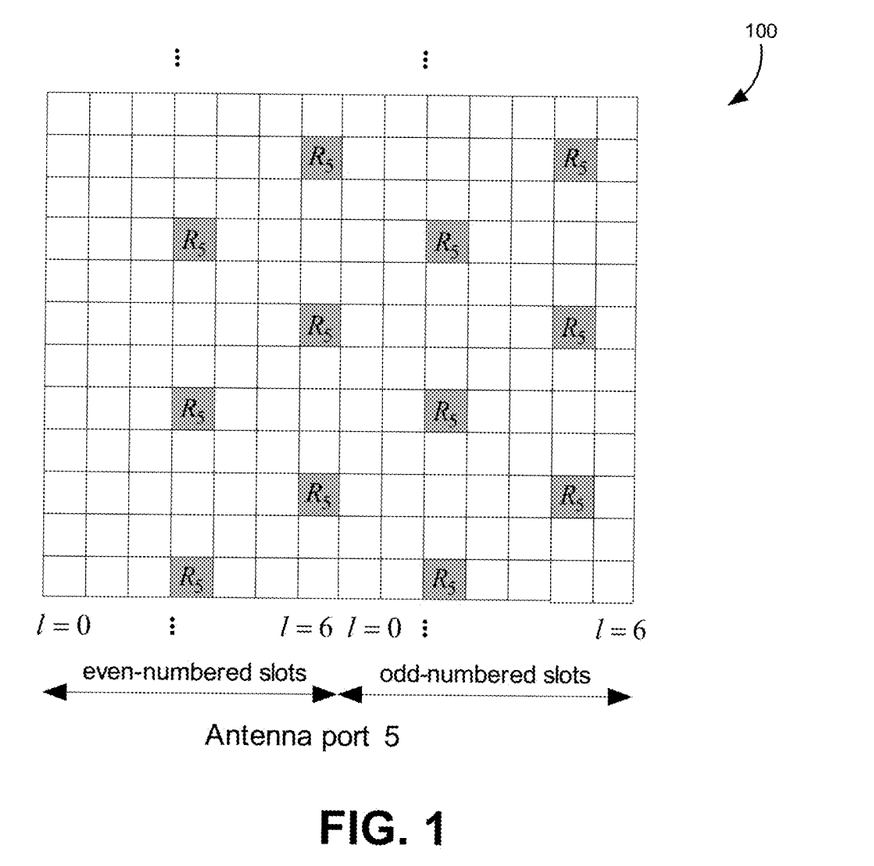
FIG. 1 illustrates a Long Term Evolution (LTE) system which is provided with spaced pilot sequences.

In an orthogonal frequency division multiplexing (OFDM) system, some pilot sequences known to the receiver are transmitted on a time-frequency domain at intervals. For example, as shown in FIG. 1, the Long Term Evolution (LTE) system is provided with spaced pilot sequences, by which the receiver can restore channels on subcarriers and perform smoothing on the time-frequency domain so as to obtain channel estimation results on the whole time-frequency domain by common methods such as the Wiener filtering method, the simple linear interpolation method or FFT method with time-frequency domain transformation.

However, in the LTE system, beam forming of smart antennas may cause discontinuous phases among subbands of the OFDM in transmission modes 7 or 8. Therefore, in the situation of smoothing among subbands, the channel estimation error can be significant and the subbands may become narrow. For example, in the LTE channel, a resource block generally presents a discontinuous channel (in LTE, one resource block includes 12 subcarriers, and there are 3 or 4 UE-RS pilot frequencies thereon); in the situation of smoothing by a traditional filter in the resource block, the error may also be significant due to the edge effect of the filter.

Figure 2:
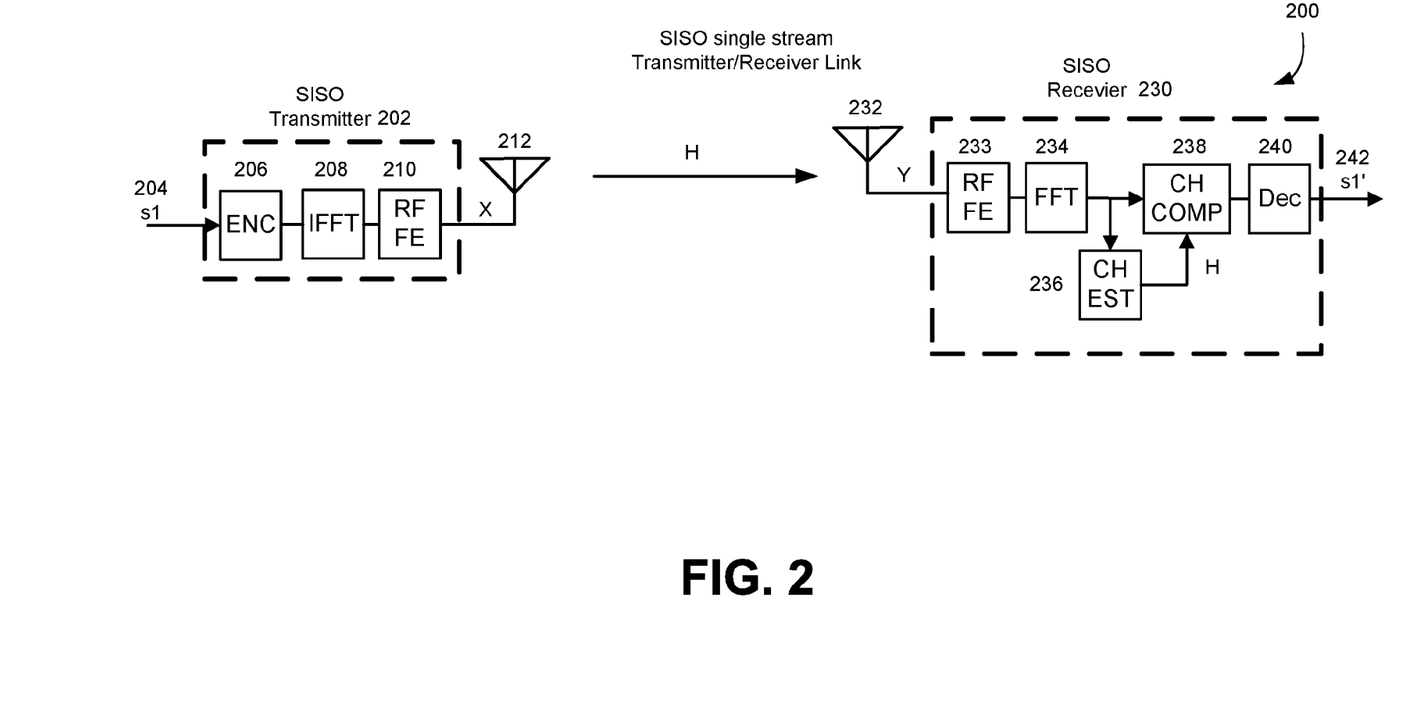
FIG. 2 illustrates a single stream OFDM transmitter.

In an OFDM receiver, channel smoothing is performed on the estimated channel in order to reduce the effects of noise on the estimated channel, thereby improving the system packet error performance. FIG. 2 illustrates a single stream OFDM transmitter 202 accepting an input stream s1 204 to a baseband encoder 206 which encoded stream is provided to an inverse fast Fourier transform (IFFT) 208 to produce a plurality of baseband subcarriers such as 2 through 2024 or 2 through 512and the subcarriers are modulated to a carrier frequency for coupling to an antenna 212 as transmitted signal X. The transmitted signal X is coupled through a channel with a frequency dependent characteristic H to receive antenna 232 of receiver 230 to form received signal Y=HX. The receiver 230 receives signal Y, which is baseband converted using RF Front End 233 and applied to FFT 234 to channel compensator 238 and to decoder 240 which generates the received stream S1'. Channel estimator 236 estimates the channel characteristic H during a long preamble interval, and the channel characteristic H is applied to channel compensator 238.

Figure 3A:
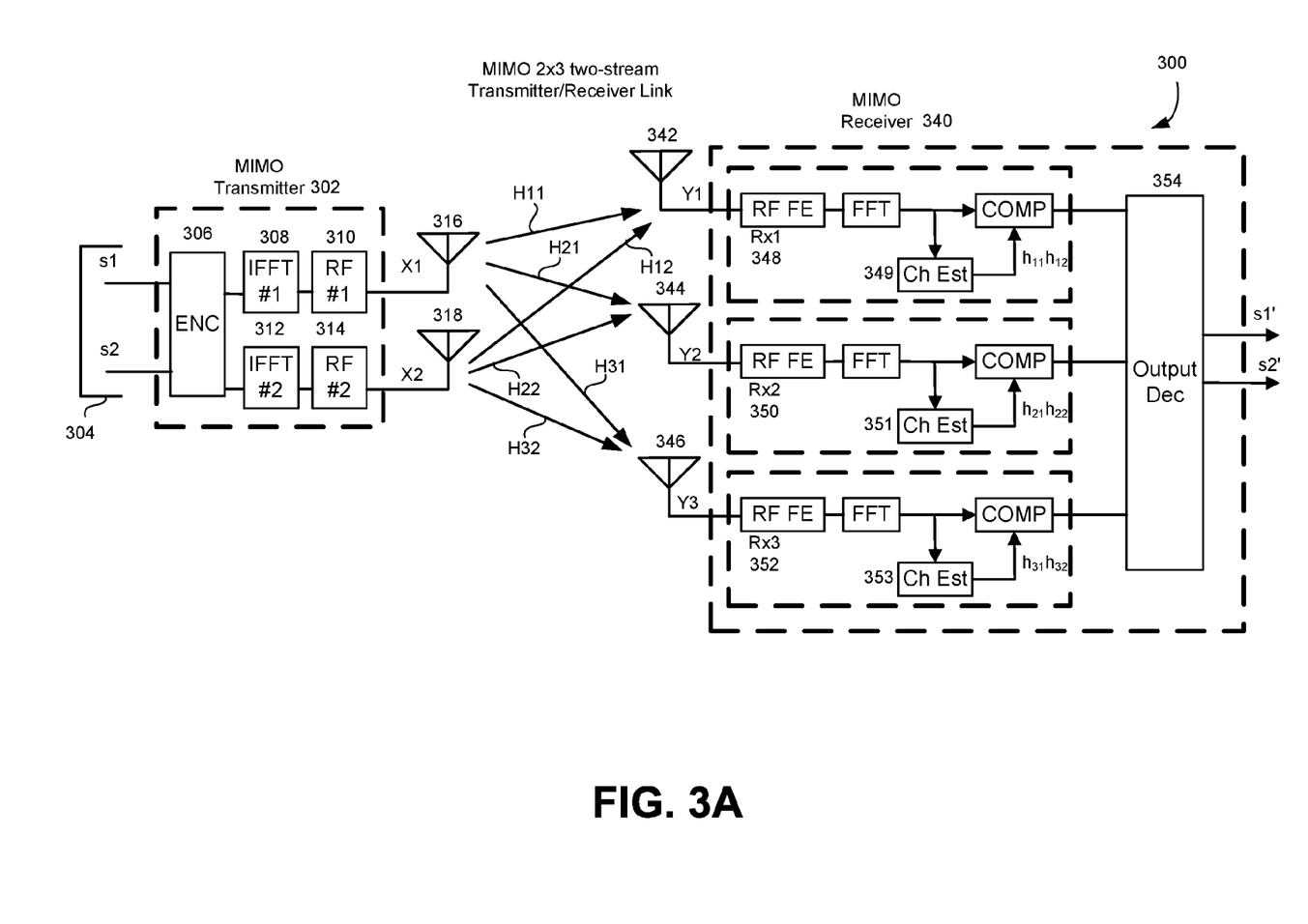
FIG. 3A illustrates a Multiple Input Multiple Output (MIMO) receiver.

FIG. 3A illustrates a Multiple Input Multiple Output (MIMO) receiver 340 operative on two transmit streams s1 and s2 304 encoded 306 and provided to first stream IFFT 308 which generates baseband subcarriers, which are provided to RF modulator and amplifier 310 and coupled as X1 to antenna 316. Second stream IFFT 312 and RF modulator and amplifier 314 similarly generate subcarriers which are upconverted and coupled to antenna 318 as X2. Receiver 340 has three antennas 342, 344, 346, which couple to receivers 348, 350, 352 and to output decoder 354 which forms decoded streams s1' and s2'. Each receiver 348, 350, 352 performs the receive functions as described for FIG. 2, however the channel estimation function 349, 351, 353 for each receiver uses the long preamble part of the packet to characterize the channel from each transmit antenna 316, 318 to each receive antenna 342, 344, 346. For example, receiver 348 must characterize and compensate the channel h11 from 316 to 342 as well as channel h21 from 318 to 342. Each channel characteristic h11 and h21 is a linear array containing real and imaginary components for each subcarrier, typically 1 through 1024. The channel estimator 349 therefore contains h11 and h21, estimator 351 contains h21 and h22, and channel estimator 353 contains h31 and h32. The 2.times.3 MIMO case of FIG. 3A shows the case where the number of remote transmitters Nt=2 and the number of local antennas and receivers Nr=3. For a MIMO receiver where the number of remote transmitters is Nt and the number of local antennas and receivers is Nr, the Nt*Nr channels have a frequency response which may be smoothed over a range of subcarrier frequencies using a finite impulse response (FIR) filter for I and Q channels. Such a channel smoothing filter would require a total of 2*Nt*Nr filters. For a 13 tap FIR filter, each tap would have an associated multiplier, so such an implementation would require 13 complex multipliers for each filter, or 26*Nt*Nr multipliers total at each receiver station.

Figure 3B:
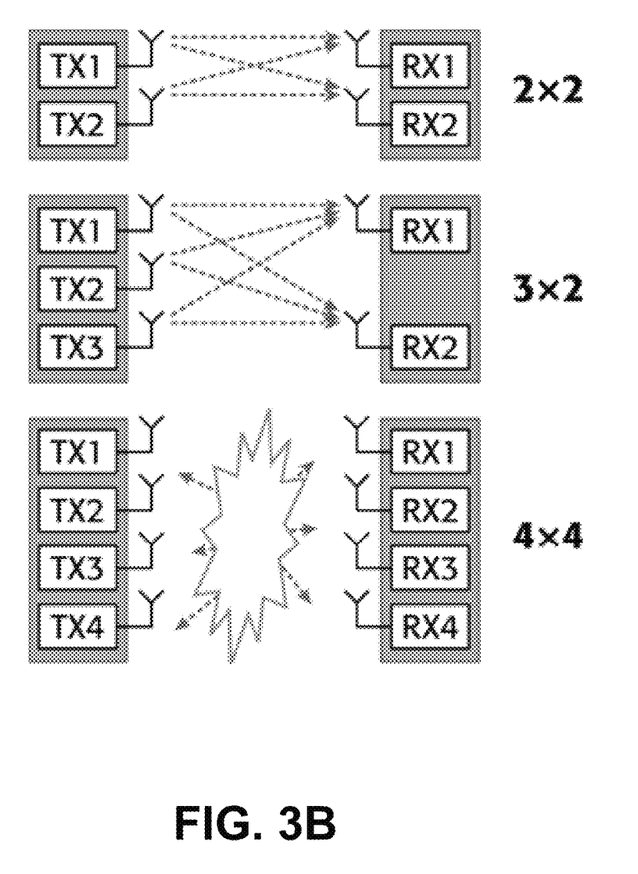
FIG. 3B is a simplified diagram illustrating various types of MIMO configuration.

It is to be appreciated that communicaiton interfaces can have other MIMO configurations. FIG. 3B is a simplified diagram illustrating various types of MIMO configuration.

Accordingly, due to channel discontinuity, the smoothing processing will result in significant errors in the channel estimation results. These errors affecting the performance, and signal quality. Thus, a method for obtaining more accurate channel estimation results is needed.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Aspects of the present invention relate to the use of the pilot signals within each resource blocks to determine the phase, and adjust the phase of each resource block in order to get a continuous wave. Then, smoothing is performed on the continuous wave, and then the original waveform is restored.

A further aspect of the present invention includes obtaining an average of channel information in a subband by calculating the average value of the pilot frequency descrambled in the subband. Then, obtaining channel estimation results according to phase difference among the subcarriers in the subband, average value of the channel and phase rotation. The method can be used to obtain better channel estimation result in a small subband and also overcomes the traditionally significant channel estimation error due to discontinuous phases.

Further, phase differences of a subcarrier interval can be obtained directly by the pilot frequency. The phase differences among pilot frequencies are normalized to one subcarrier by distance and averaged. Channel estimation results obtained by the phase rotation can also be obtained by pilot frequency rotation.

Figure 4A:
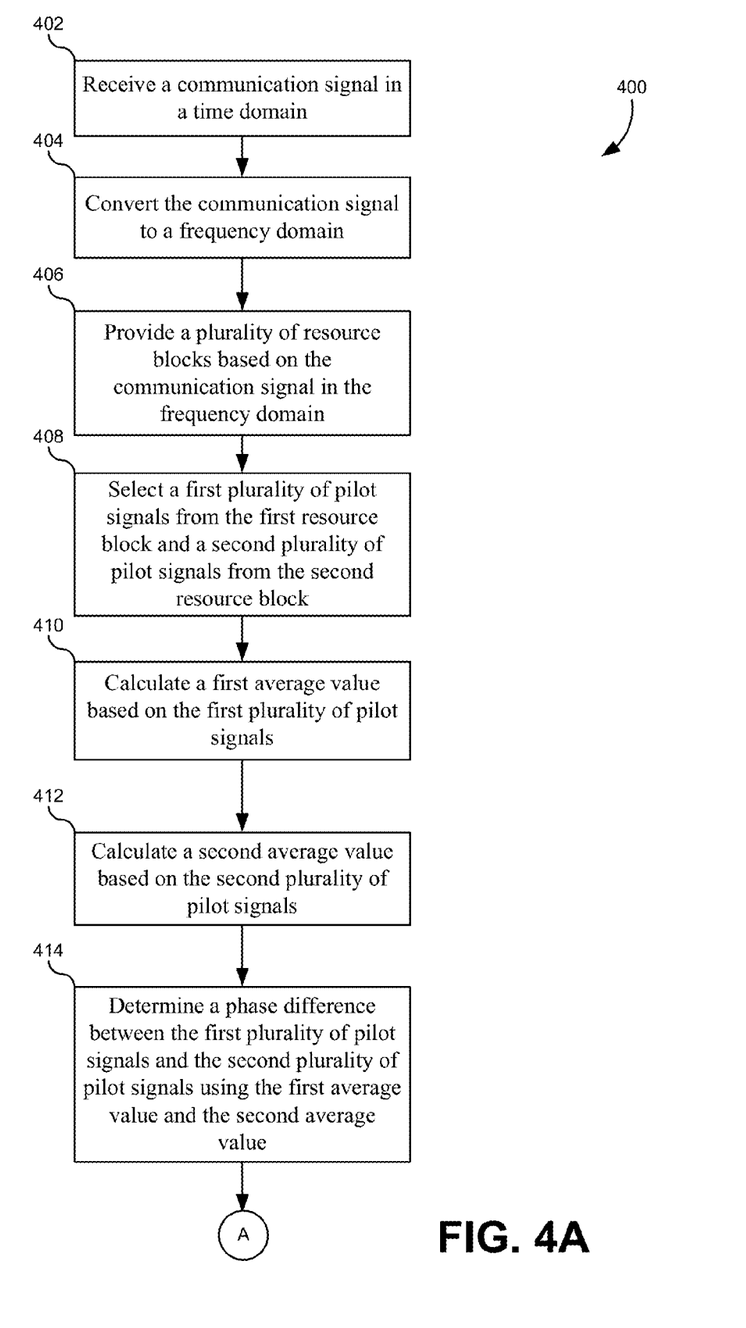
FIGS. 4A and 4B illustrate a flow diagram for processing communication signals, according to one embodiment of the invention.
Figure 4B:
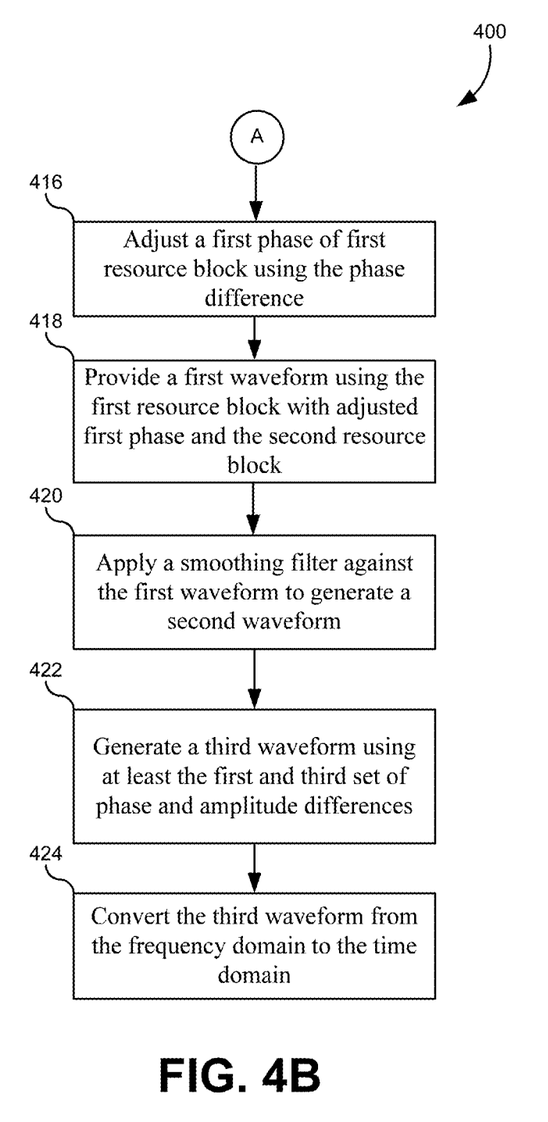

FIGS. 4A and 4B illustrate a method 400 for performing processing of communication signals, according to one embodiment of the invention. At process block 402 a communication signal in a time domain is received. The communication signal to a frequency domain is converted (process block 404). At process block 406, a plurality of resource blocks based on the communication signal in the frequency domain are provided. In one embodiment, the plurality of resource blocks includes a first resource block and a second resource block.

At process block 408, a first plurality of pilot signals from the first resource block and a second plurality of pilot signals from the second resource block are selected. A first average value based on the first plurality of pilot signals is then calculated (process block 410). A second average value based on the second plurality of pilot signals is also calculated (process block 412).

At process block 414, a phase difference between the first plurality of pilot signals and the second plurality of pilot signals using the first average value and the second average value is determined. At this point the method 400 continues to FIG. 4B at point A. Then, at process block 416, a first phase of first resource block using the phase difference is adjusted.

At process block 418, a first waveform using the first resource block with adjusted first phase and the second resource block is provided. Then, a smoothing filter against the first waveform to generate a second waveform is applied (process block 420). In one embodiment, a Weiner filter, a discrete Fourier Transform or an inverse discrete Fourier Transform may be used. At process block 422, a third waveform using at least the first and third set of phase and amplitude differences is generated. Then, the third waveform from the frequency domain to the time domain is converted (process block 424).

Furthermore, a number of pilot signals to use may be selected as well as a fourth waveform on the edge of the second resource block may also be selected. Method 400 also calculates a phase average of the first and second resource blocks, adjusts the phase of the first resource block, and adjusts the phase of the second resource block.

Figure 5:
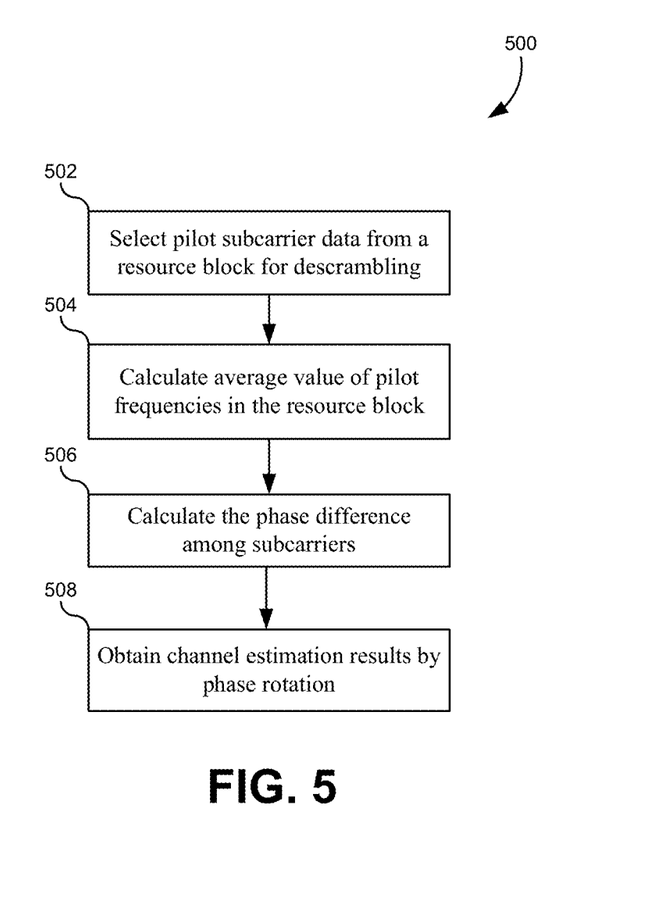
FIG. 5 illustrates a flow diagram for processing communication signals, according to another embodiment of the invention.

Turning now to FIG. 5 which illustrates a method 500 for performing processing of communication signals, according to a further embodiment of the invention. According to FIG. 1, pilot frequencies from a subband (such as one RB) in an OFDM symbol are selected, and set it as $Plot_i$, i=0, 1, 2, ... N−1 (process block 502). Then, average value of pilot frequencies as $$Ave = \frac{1}{N} \sum_{i=0}^{N-1} Plot_i$$

is set, and a phase of Ave as Phase_Ave is also set (process block 504).

The phase of each pilot frequency is calculated (process block 506) and set as $Phase\_Plot_i$. A distance between the subcarrier corresponding to each pilot frequency and averaging intermediate subcarrier as $Dist_i$ is set, and the phase difference between each pilot frequency and Ave and normalize the difference to one subcarrier is calculated, and set as: PhasePerSubcarr$_i$=(Ave−Phase_Plot$_i$)/Dist$_i$. The PhasePerSubcarr$_i$ is not calculated if Dist$_i$ is0.

The average value in the subband and set it as AvePhasePreSubCar is solved, the channel estimation results of all subcarriers in the subband is calculated, and set as R$_m$ by calculating the distance between the current subcarrier and the subcarrier corresponding to average value Ave; m=0, 1, M−1, where M is number of subcarriers in the subband; calculate phase difference as AvePhasePreSubCar×R$_m$. Then, the channel estimation result by Ave phase rotation AvePhasePreSubCar×R$_m$ is obtained (process block 508).

Figure 6:
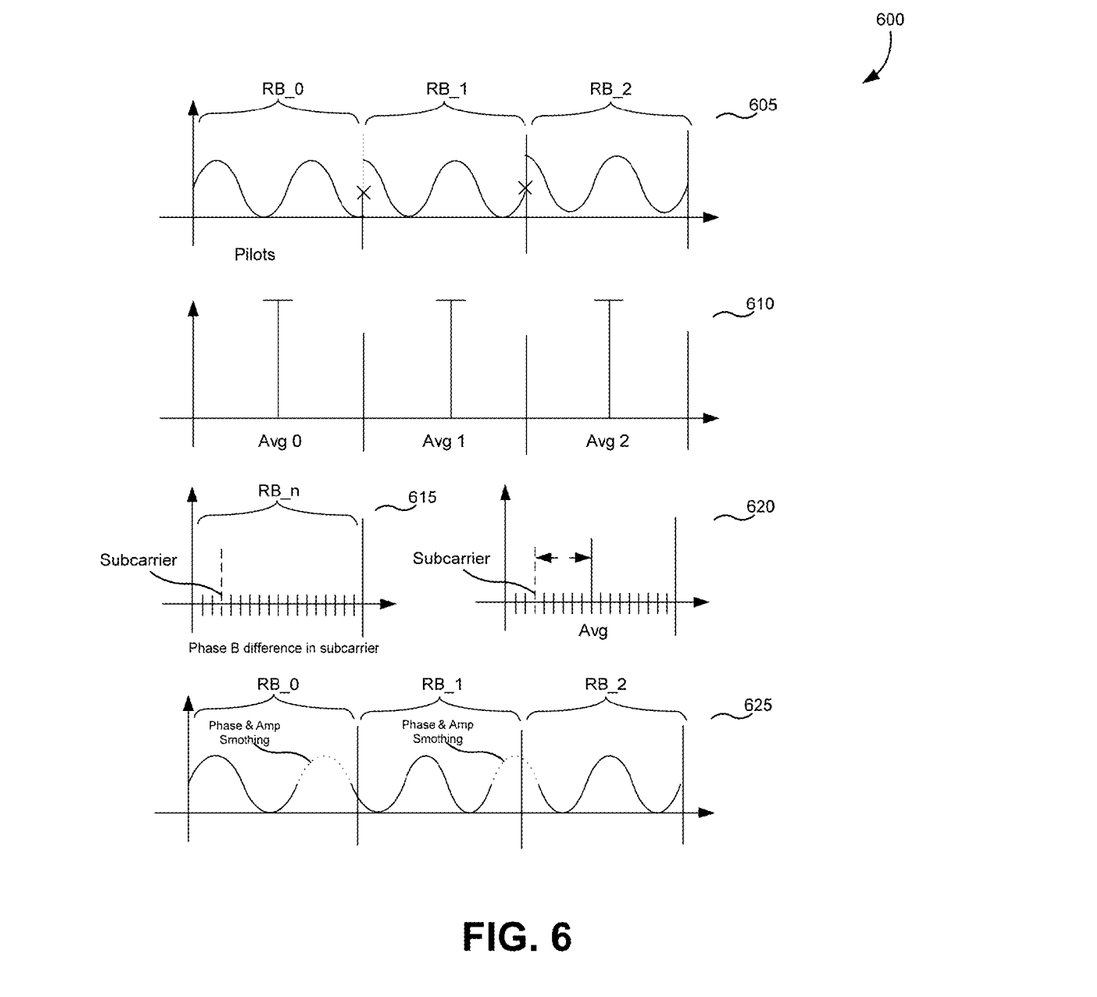
FIG. 6 illustrates waveform diagrams, according to one embodiment of the invention.

Turning now to FIG. 6 which illustrates multiple waveforms in accordance with embodiments of the present invention. Graph 605 shows the original waveform with resource block RB_0, RB_1, RB_2. Then, graph 610 shows smoothing within the RBs by smoothing the amplitudes. Graph 615 shows smoothing the phase within the RBs, and graph 620 shows obtaining the avg. Finally, graph 625 shows restoring the waveform back to the original waveform after smoothing occurs.

Figure 7:
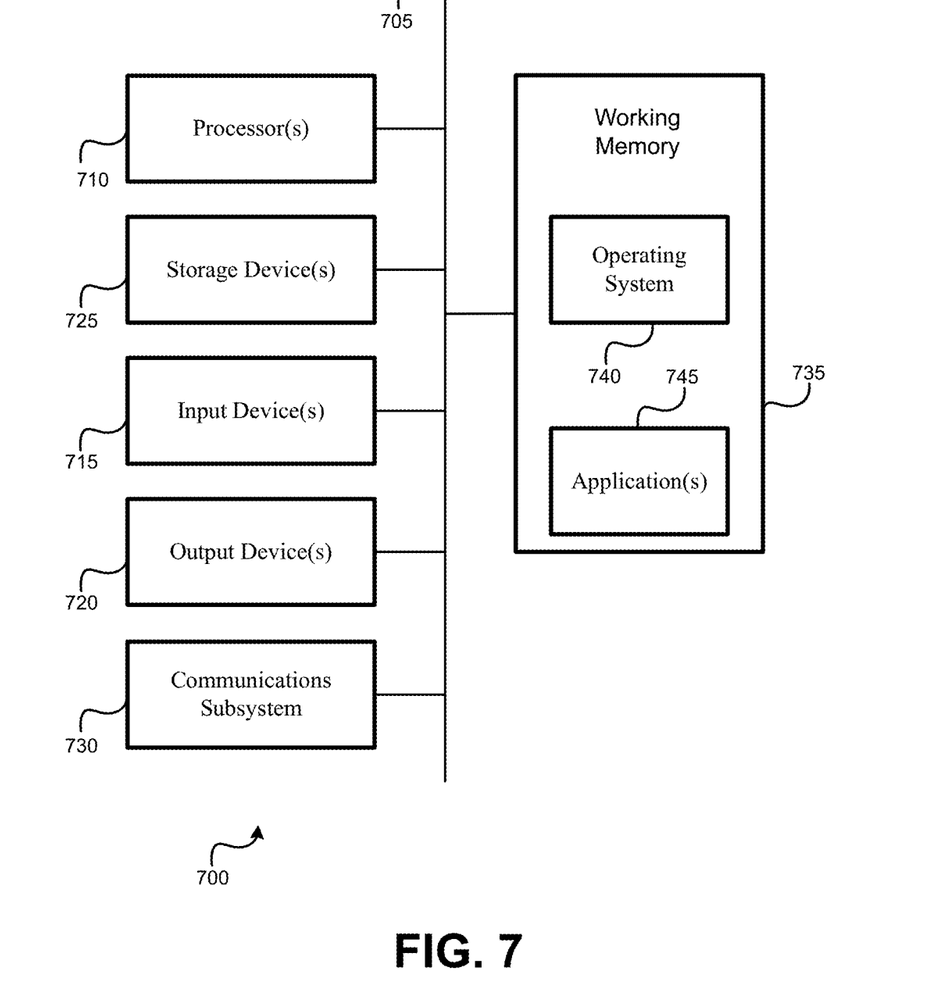
FIG. 7 illustrates a block diagram of an exemplary computer hardware system that may be used to implement various embodiments.

FIG. 7 illustrates a block diagram of an exemplary computer system 700 that may be used to implement various embodiments. Some embodiments may employ a computer system (such as the computer system 700) to perform methods in accordance with various embodiments of the invention. The computer system may be implemented using various circuits, microchips, and connections within a mobile device. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of processing communication signals, the method comprising:
   receiving a communication signal in a time domain;
   converting the communication signal to a frequency domain;
   providing a plurality of resource blocks based on the communication signal in the frequency domain, the plurality of resource blocks including a first resource block and a second resource block;
   selecting a first plurality of pilot signals from the first resource block and a second plurality of pilot signals from the second resource block;
   calculating a first average value based on all of the first plurality of pilot signals;
   calculating a second average value based on all of the second plurality of pilot signals;
   determining a phase difference between the first plurality of pilot signals and the second plurality of pilot signals using the first average value and the second average value;
   adjusting a first phase of the first resource block using the phase difference;
   providing a first waveform using the first resource block with adjusted first phase and the second resource block;
   applying a smoothing filter against the first waveform to generate a second waveform;
   generating a third waveform using at least the second waveform and a set of phase and non-zero amplitude differences; and
   converting the third waveform from the frequency domain to the time domain.

2. The method of claim 1, further comprising selecting a number of pilot signals to use.

3. The method of claim 1, further comprising selecting a fourth waveform on the edge of the second resource block.

4. The method of claim 1, further comprising calculating a phase average of the first and second resource blocks.

5. The method of claim 4, further comprising adjusting a phase of the second resource block.

6. The method of claim 1, wherein the smoothing filter comprises a Weiner filter.

7. The method of claim 1, wherein the smoothing filter comprises a discrete Fourier Transform or an inverse discrete Fourier Transform.

8. The method of claim 1, wherein the communication signal comprises an Orthogonal Frequency Division Multiplexing (OFDM) Signal.

9. The method of claim 1, wherein the communication signal is received via Long Term Evolution (LTE) communication network.

10. A system for processing communication signals, the system comprising:
    a memory device; and
    a computer processor in communication with the memory device, wherein the memory device includes sets of instructions when executed by the computer processor, cause the computer processor to:
    receive a communication signal in a time domain;
    convert the communication signal to a frequency domain;
    provide a plurality of resource blocks based on the communication signal in the frequency domain, the plurality of resource blocks including a first resource block and a second resource block;
    select a first plurality of pilot signals from the first resource block and a second plurality of pilot signals from the second resource block;
    calculate a first average value based on all of the first plurality of pilot signals;
    calculate a second average value based on all of the second plurality of pilot signals;
    determine a phase difference between the first plurality of pilot signals and the second plurality of pilot signals using the first average value and the second average value;
    adjust a first phase of the first resource block using the phase difference;
    provide a first waveform using the first resource block with adjusted first phase and the second resource block;
    apply a smoothing filter against the first waveform to generate a second waveform;
    generate a third waveform using at least the second waveform and a set of phase and non-zero amplitude differences; and
    convert the second waveform from the frequency domain to the time domain.

11. The system of claim 10, wherein the sets of instructions further cause the computer processor to select a number of pilot signals to use.

12. The system of claim 10, wherein the sets of instructions further cause the computer processor to select a fourth waveform on the edge of the second resource block.

13. The system of claim 10, wherein the sets of instructions further cause the computer processor to calculate a phase average the first and second resource blocks.

14. The system of claim 13, wherein the sets of instructions further cause the computer processor to adjust a phase of the second resource block.

15. A non-transitory computer-readable medium for processing communication signals, the computer-readable medium having sets of instructions stored thereon which, when executed by a computer cause the computer to:
    receive a communication signal in a time domain;
    convert the communication signal to a frequency domain;
    provide a plurality of resource blocks based on the communication signal in the frequency domain, the plurality of resource blocks including a first resource block and a second resource block;
    select a first plurality of pilot signals from the first resource block and a second plurality of pilot signals from the second resource block;
    calculate a first average value based on all of the first plurality of pilot signals;
    calculate a second average value based on all of the second plurality of pilot signals;

determine a phase difference between the first plurality of pilot signals and the second plurality of pilot signals using the first average value and the second average value;
adjust a first phase of the first resource block using the phase difference;
provide a first waveform using the first resource block with adjusted first phase and the second resource block;
apply a smoothing filter against the first waveform to generate a second waveform;
generate a third waveform using at least the second waveform and a set of phase and non-zero amplitude differences of the first and second resource blocks; and
convert the second waveform from the frequency domain to the time domain.

16. The computer-readable medium of claim 15, wherein the sets of instructions further cause the computer to select a number of pilot signals to use.

17. The computer-readable medium of claim 15, wherein the sets of instructions further cause the computer to select a fourth waveform on the edge of the second resource block.

18. The computer-readable medium of claim 15, wherein the sets of instructions further cause the computer to calculate a phase average of the first and second resource blocks.

* * * * *